United States Patent
Kwan et al.

[11] Patent Number: 5,844,398
[45] Date of Patent: Dec. 1, 1998

[54] AUTOMATIC BATTERY CHARGING SYSTEM USING LOWEST CHARGE CURRENT DETECTION

[76] Inventors: Hing-Hin Kwan, Flat B1, 12F, Cambridge Court, 84, Waterloo Road, Kowloon, Hong Kong; Yao-Ching Chen, No10 Aly. 21 Lane 357 Sec. 2 Lung-Kang Road, Chung-Li City, Taoyuan Hsien, Taiwan; Cheng-Chih Chu, No.1 Aly. 3 Lane 441, Shan-Ting Sec., Chung-Feng Road, Taoyuan Hsien, Taiwan; Shu-Chin Chen, No. 30 Aly. 3 Lane 469 Shan-Ting Sec., Chung-Feng Road, Taoyuan Hsien, Taiwan; Chun-Sheng Wang, 4F, No.2 Aly.7 Lane 231 Hong-Kwan Road, Pei-Tou Taipei, Taiwan

[21] Appl. No.: 260,655
[22] Filed: Jun. 16, 1994
[51] Int. Cl.⁶ .................................................. H01M 10/46
[52] U.S. Cl. ................................ 320/31; 320/39; 320/48
[58] Field of Search ................................ 320/31, 22, 39, 320/48, 5; 363/73

[56] References Cited

U.S. PATENT DOCUMENTS

4,114,083  9/1978  Benham et al. .......................... 320/39

Primary Examiner—Edward H. Tso
Attorney, Agent, or Firm—Pro-Techtor International

[57] ABSTRACT

An automatic charging system for charging nickel-metal-hydride batteries is presented. The battery charging system uses a method of detecting the lowest charge current to control its charging process. The system has a constant voltage power supply including a short-circuit protection device, a battery voltage detector, a current detector, a current to voltage converter, a voltage amplifier, an analog to digital converter, a single chip microcomputer, a capacity indicator, a time indicator and a full-charge indicator. The system uses a constant voltage to charge batteries with a floating current according to the quantity of the active ions in the batteries. The battery charge current is converted to a voltage signal which is then amplified and digitized. The microcomputer detects the digitized signal to estimate the magnitude of the charge current. By detecting continuous increase in the charge current, the system determines if the charging process has reached its end and shuts down the power supply at appropriate time. It avoids providing too much input energy and generating extra heat. Therefore, the system has high charging efficiency and is less likely to damage the batteries.

3 Claims, 13 Drawing Sheets

AUTOMATIC BATTERY CHARGING SYSTEM USING LOWEST CHARGE CURRENT DETECTION

FIELD OF THE INVENTION

The invention relates to a high speed charging system, more specifically to an automatic charging system for nickel-metal-hydride batteries that have water soluble electrolyte containing $(OH)^-$, and a positive electrode made of nickel metal.

BACKGROUND OF THE INVENTION

In recent years, the environmental protection has become an important issue in the world. To reduce the disposal of toxic material, people began using more and more reusable batteries. In addition, many new portable electronic devices, such as portable cassette radios, cellular phones, notebook computers, and video cameras, also greatly increase the demand of reusable batteries. California state requires that 2 percent of automobiles be powered electrically by 1998. The ratio of electric cars has to increase to 10 percent after five more years. It is no doubt that the demand of reusable batteries will keep on increasing. High capacity and long life reusable batteries have been researched and developed. The nickel-metal-hydride batteries are among the most popular ones.

It is well known that significant progress has been made in improving the property of the reusable batteries. Nevertheless, the battery charging device remains very much the same as before. In general, manufacturers or designers of battery charging system only pay attention to the electric characteristics of batteries. The basic chemical reaction occurring in the batteries is rarely considered. Therefore, most of the battery charging system can only satisfy the electric characteristics of the battery. The internal chemical reaction in the battery is not closely monitored during the charging process. Consequently, the speed of charging batteries as well as the capacity, temperature and life of the battery have never achieved their optimal conditions.

Figure 1:
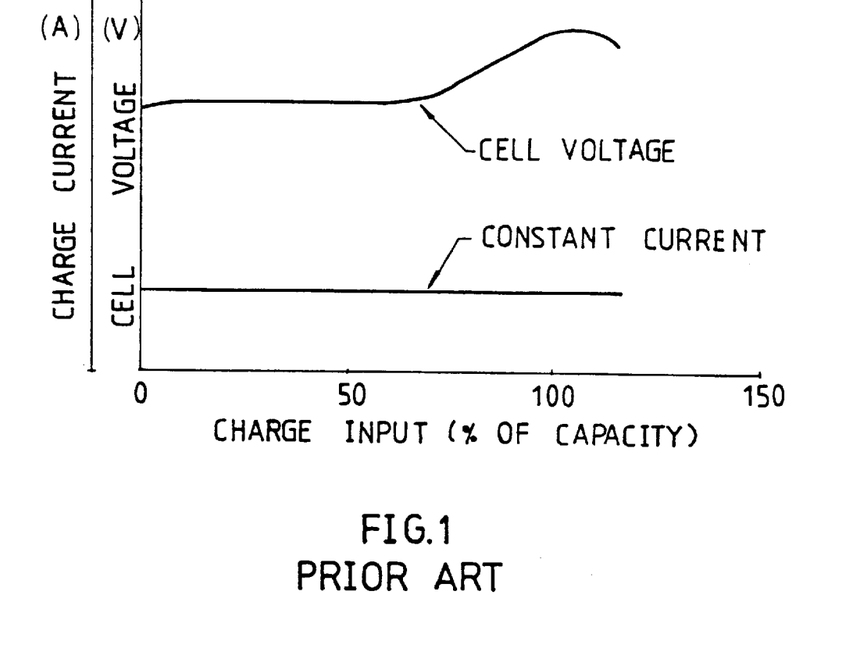
FIG. 1 shows the cell voltage and charge current as functions of charge input for a conventional charging system using constant charge current.
Figure 2:
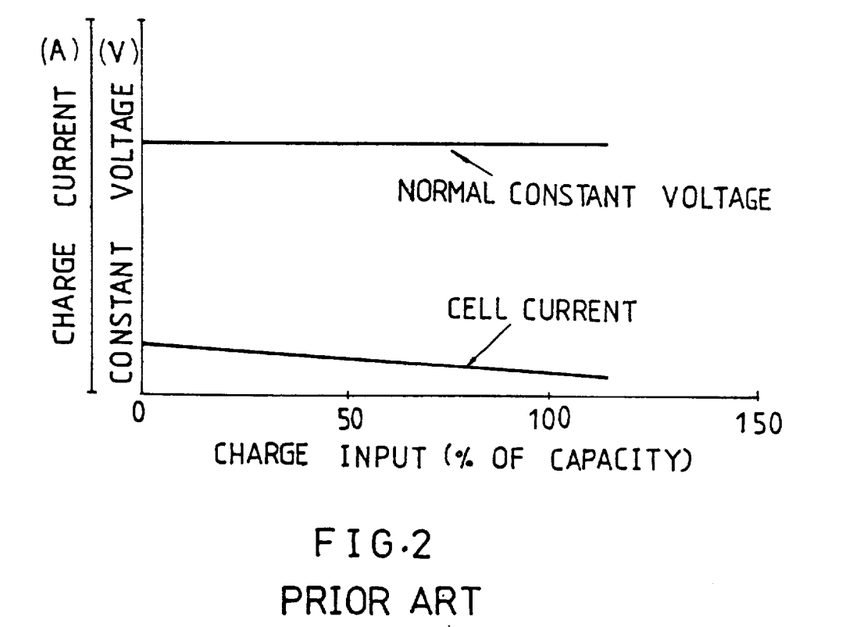
FIG. 2 shows the constant voltage and charge current as functions of charge input for a conventional charging system using constant voltage.

The charging methods used in the conventional battery charging system can be divided into two categories. One method uses constant current for charging batteries the other method uses constant Voltage. FIG. 1 shows the cell voltage and the constant current as functions of the charge input for the former method. FIG. 2 shows the cell current and the normal constant voltage as functions of the charge input for the latter method.

Figure 3:
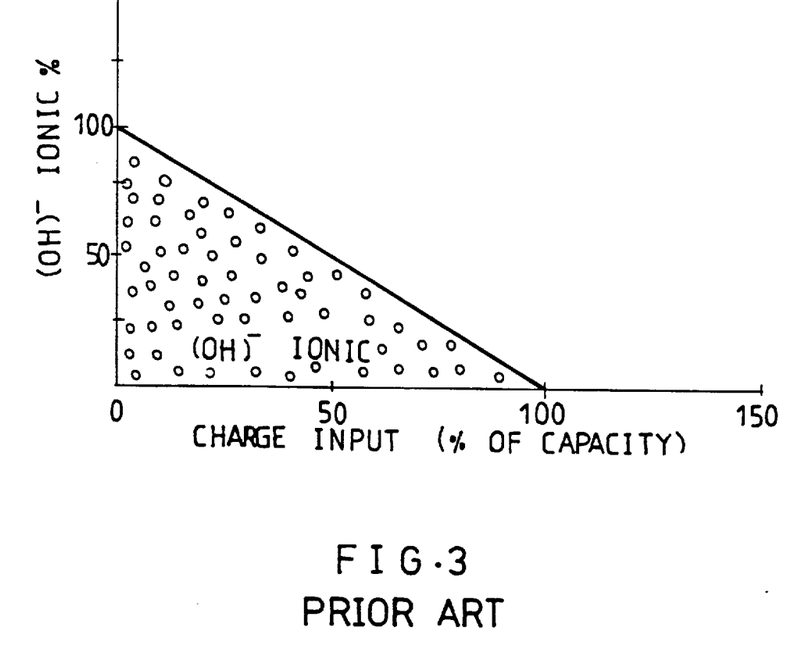
FIG. 3 shows the quantity of active ionic material as a functions of charge input.
Figure 4:
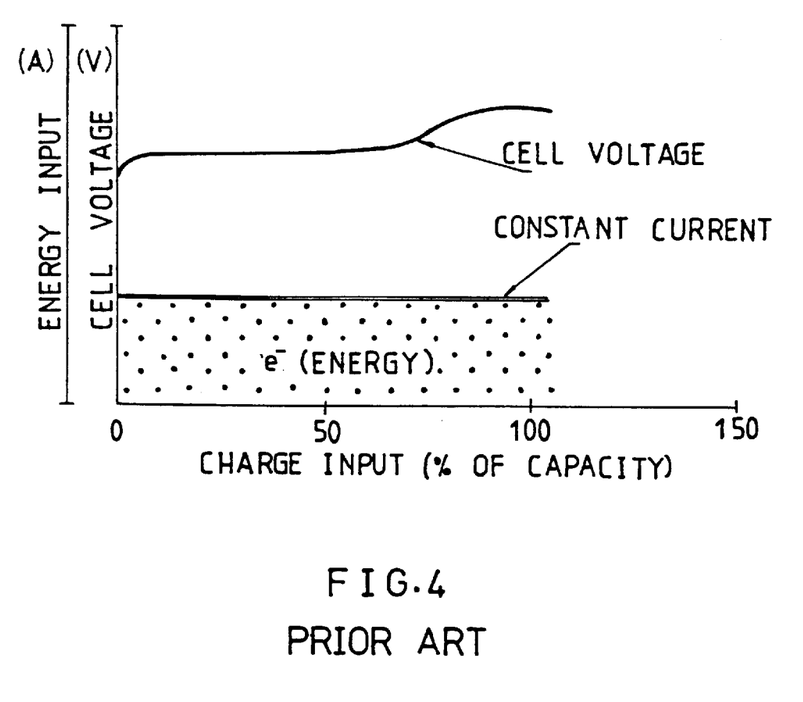
FIG. 4 shows the cell voltage and energy input to a battery as functions of charge input for a charging system using constant charge current.
Figure 6:
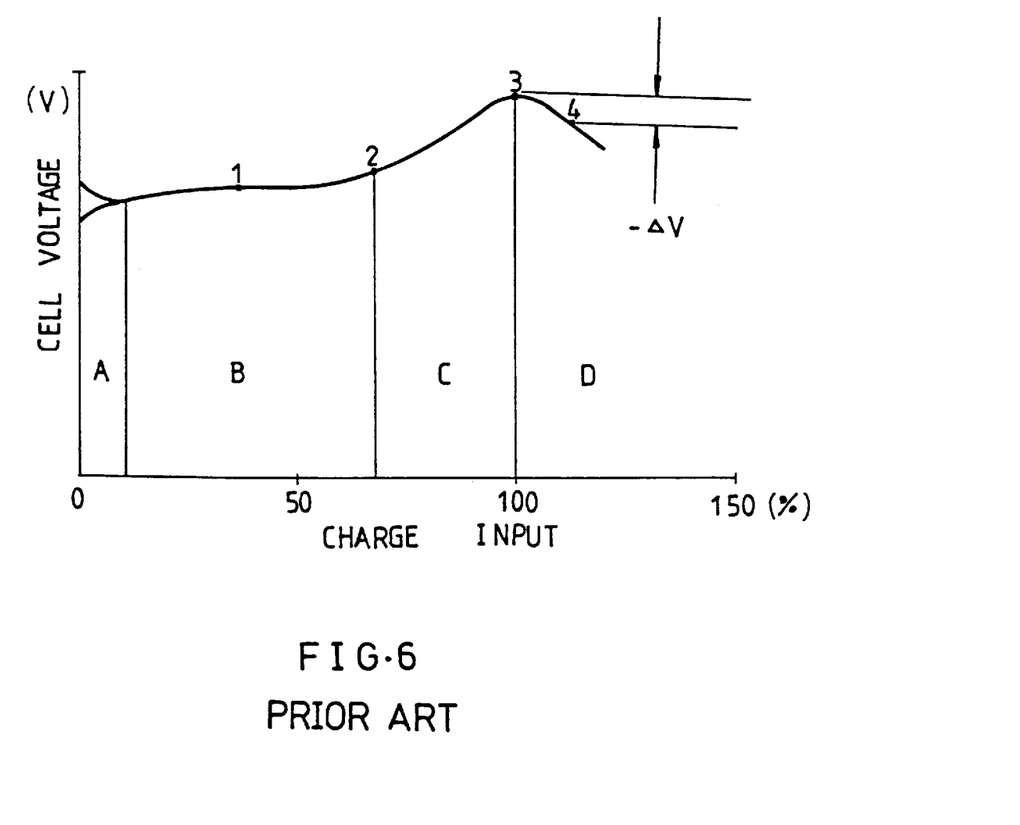
FIG. 6 shows the cell voltage variation of a battery as functions of charge input for a charging system using constant charge current.
Figure 8:
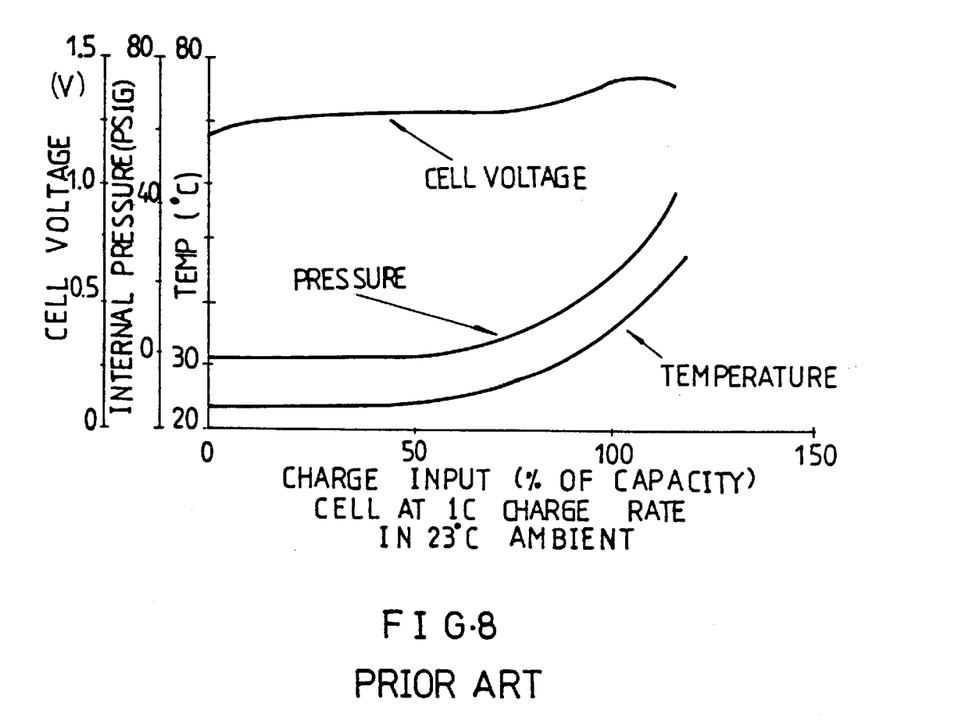
FIG. 8 shows the internal pressure and temperature as functions of charge input for a charging system using constant charge current.
Figure 9:
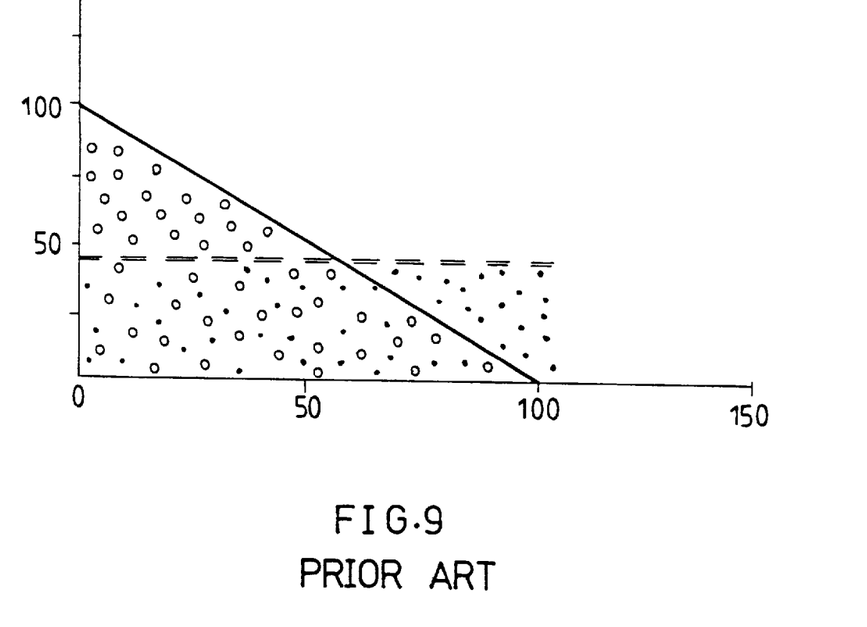
FIG. 9 shows the overlapping chart of FIGS. 3 and 4.

The method of using constant current relies on sensing the temperature, setting timer or detecting the peak charge voltage to control the charging process. FIG. 6 shows the typical peak voltage variation. It requires complex hardware structure and has the drawback of wasting energy due to the undesired extra heat generation. During the initial charging period, the potentially achievable energy is limited by the constant current. On the contrary, the constant current provides too much energy at the end of charging period because the active material in the battery has been greatly depleted. Hence, too much energy only results in over heating. FIG. 3 shows the percentage of available active $(OH)^-$ ions as a function of the charge input. FIG. 4 shows the energy input as a function of charge input in the constant current charging method. By comparing FIGS. 3 and 4, the drawback of constant current charging system as discussed early can be easily seen. FIG. 8 illustrates the fact the at the end of charging period, the internal pressure and temperature increase drastically. FIG. 9 shows the comparison chart of overlapping FIGS. 3 and 4.

The method of using constant voltage normally relies on controlling the temperature or setting the maximum voltage to control the charging process. As shown in FIG. 2, the cell current is usually set low. The disadvantage of this method is low charging speed. It is also difficult to detect the saturation point of the charged battery. Therefore, the battery is often not fully charged.

SUMMARY OF THE INVENTION

Figure 5:
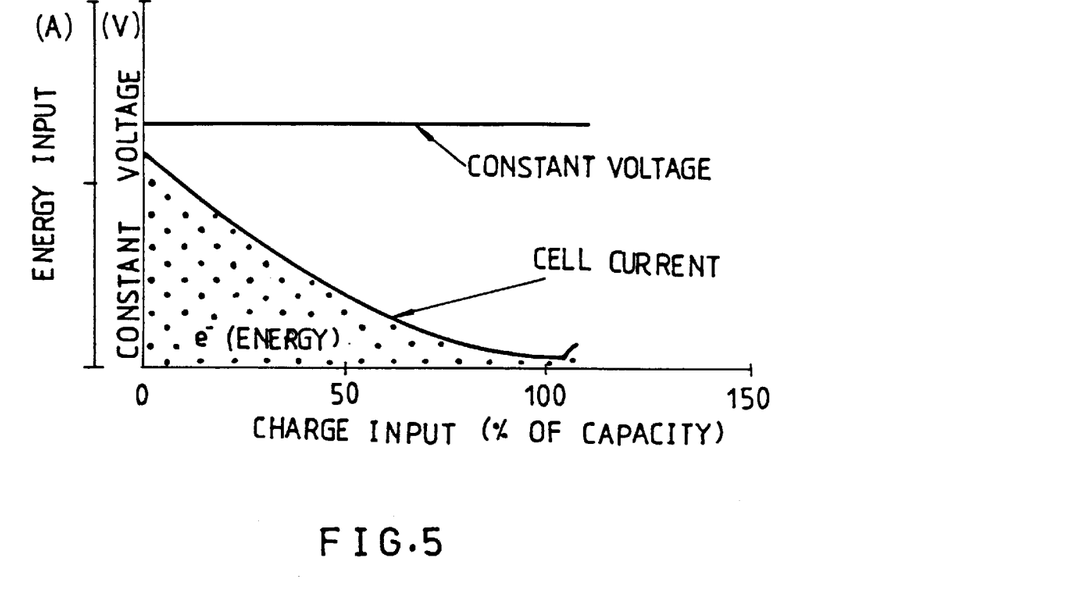
FIG. 5 shows the constant voltage and energy input to a battery as functions of charging system of this invention.
Figure 7:
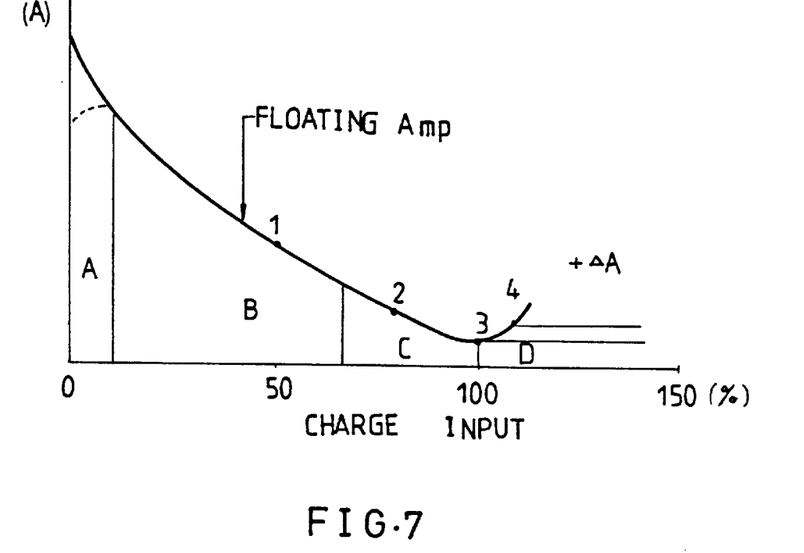
FIG. 7 shows the floating current variation of a battery as a function of charge input for charging system of this invention.
Figure 10:
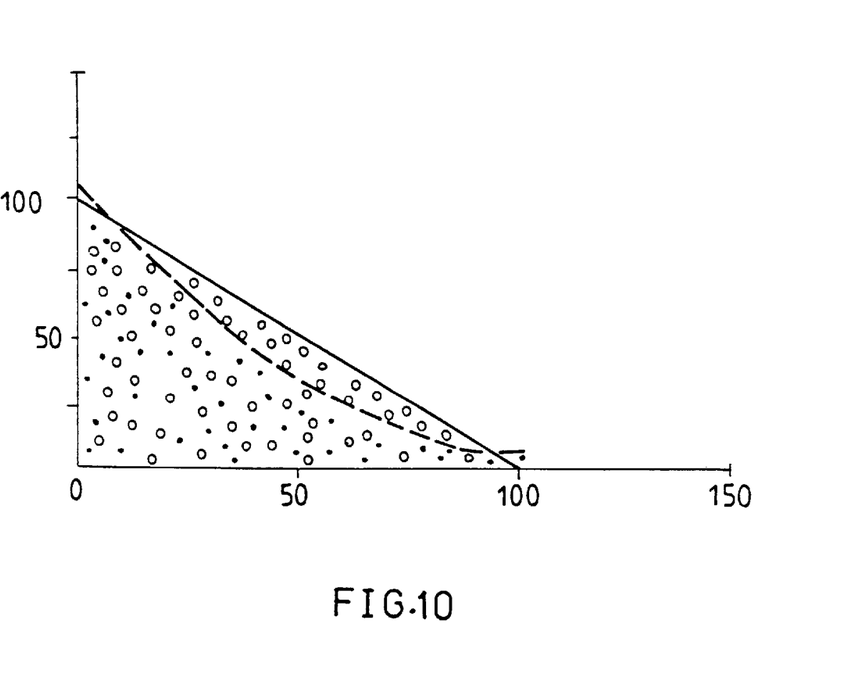
FIG. 10 shows the overlapping chart of FIGS. 3 and 5.

The present invention has been made to overcome the above drawbacks of the conventional charging system. The object of this invention is to provide an efficient charging method that uses floating charge current according to the quantity of the remaining active ionic material. FIG. 5 shows the constant voltage and cell current as functions of charge input using the charging method of this invention. The overlapping of FIG. 3 and FIG. 5 as shown in FIG. 10 shows how the charge current follows the quantity of the active ionic material. The present invention automatically detects the lowest current in order to control the charging process. FIG. 7 highlights the floating charge current variation during the charging process. It also has the advantage of avoiding damage to batteries that have been stored for a long period of time. Because of long storage time, the internal electrodes tend to be dry or crystallized. The quantity of active material and ions may temporarily be reduced. This increases the internal resistance of a battery. Under this circumstance, the charge current will be decreased and less energy will be input to the battery. Therefore, using the charging system of this invention is less likely to generate high temperature and damage the battery. It also has be en shown that a battery that has been stored for a long period of time can recover its optimal condition after 3 to 5 charges with the method of this invention.

The invention uses a constant voltage and a high charge current. By means of the floating charge current associated with a current to voltage converter, the decrease of effective resistance due to the battery internal polarization can be detected. A current to voltage converter provides a measurement of the quantity of increased current. A current to voltage converter provides a measurement of the quantity of increased current. According to the increased current, the battery charging system of this invention can control the charging process and turn off the charge current at its saturation point very precisely. The battery can be charged completely between 9 to 25 minutes. The charging time depends on the residual energy in the battery. In general, it takes approximately 18 minutes to finish charging the battery.

DETAILED DESCRIPTION OF THE PREFERRED EMBODIMENTS

Figure 11:
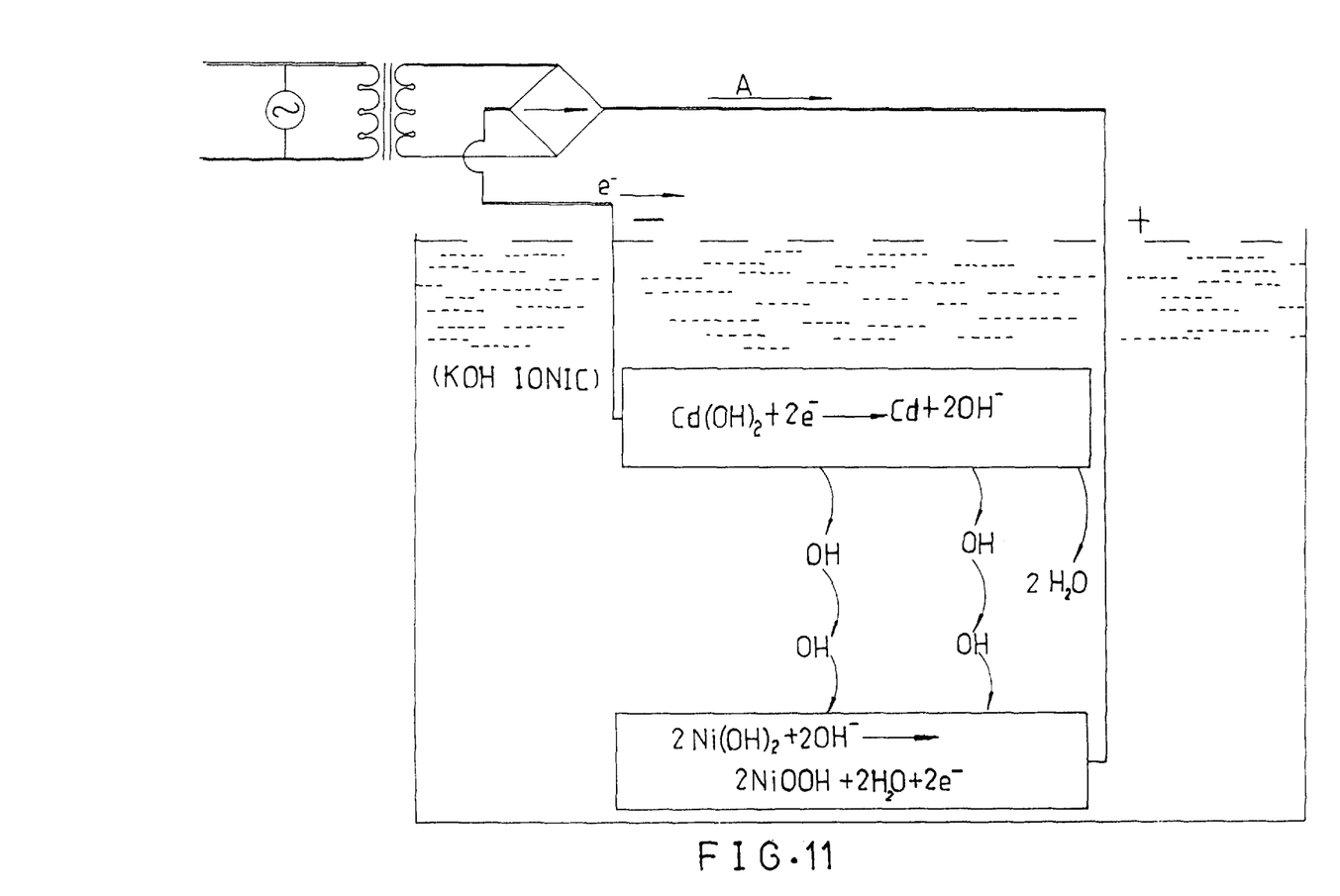
FIG. 11 shows the chemical reaction and ion exchange within electrodes of a battery when it is charged.
Figure 12:
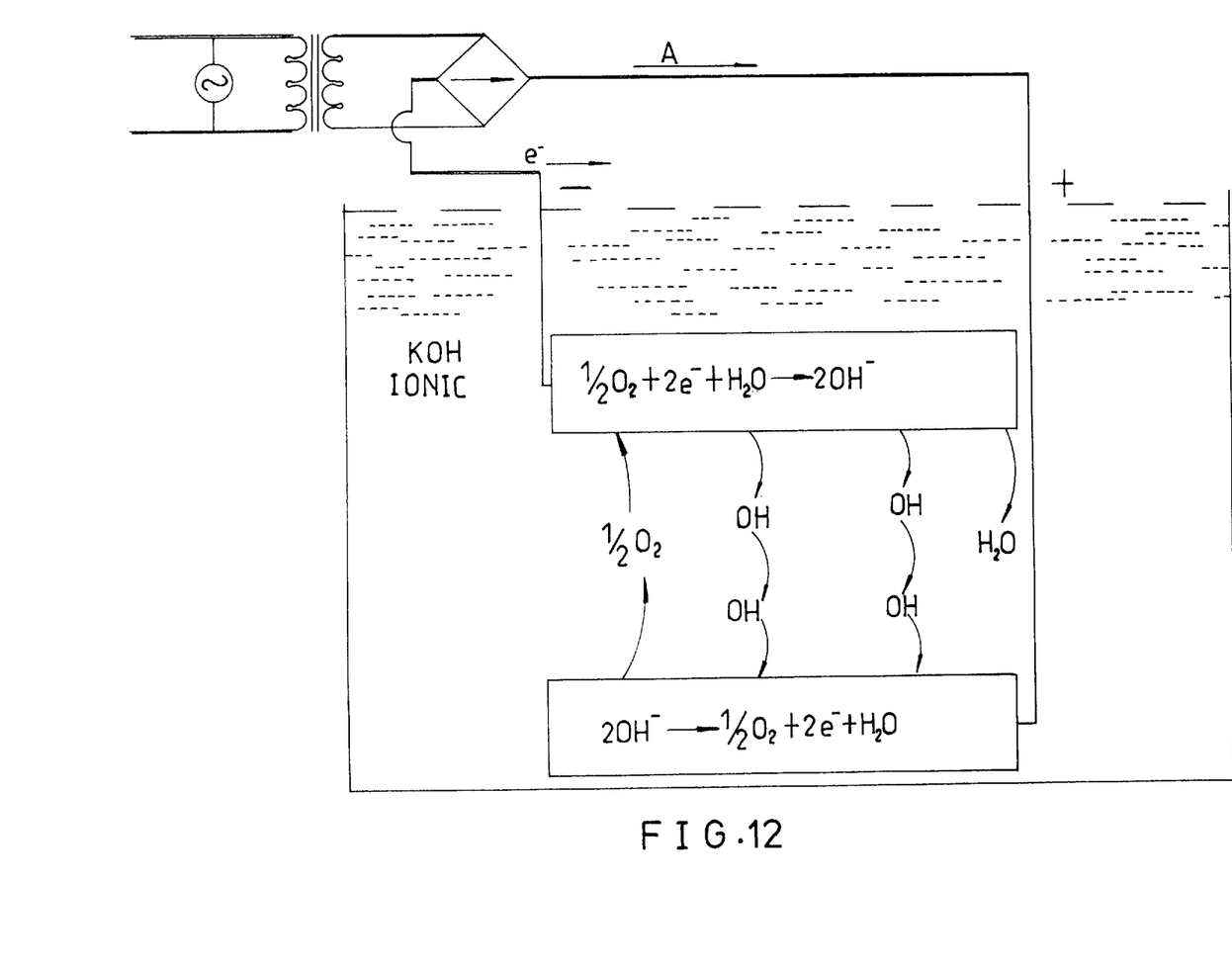
FIG. 12 shows the chemical reaction and ion exchange within electrodes of a battery when it is over charged.

The chemical reaction and ion exchange within a nickel-metal hydride battery during the charging process are shown in FIG. 11. It is known that the battery charging rate depends on the exchange rate and the quantity of ions. When the battery is fully discharged, the battery is abundant in active ionic substance. It can be charged with high efficiency and charging rate. Charging rate has to slow down towards the end of charging period to avoid generating wasted heat energy due to over charging. FIG. 12 shows the ionic reaction in the battery when it is over charged.

Figure 13:
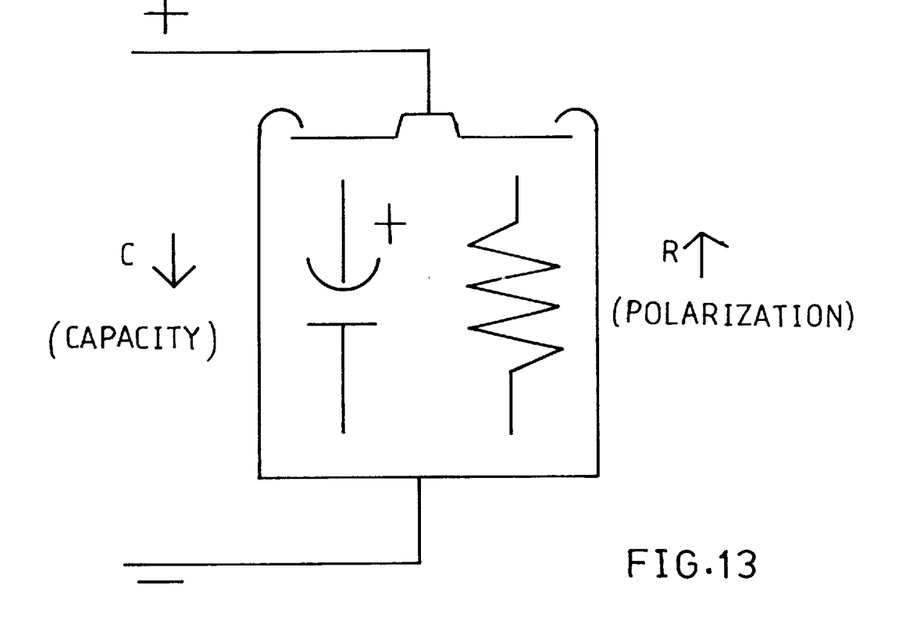
FIG. 13 shows the increasing polarization of the internal active material and the increase of effective resistance of a battery when it is charged.
Figure 14:
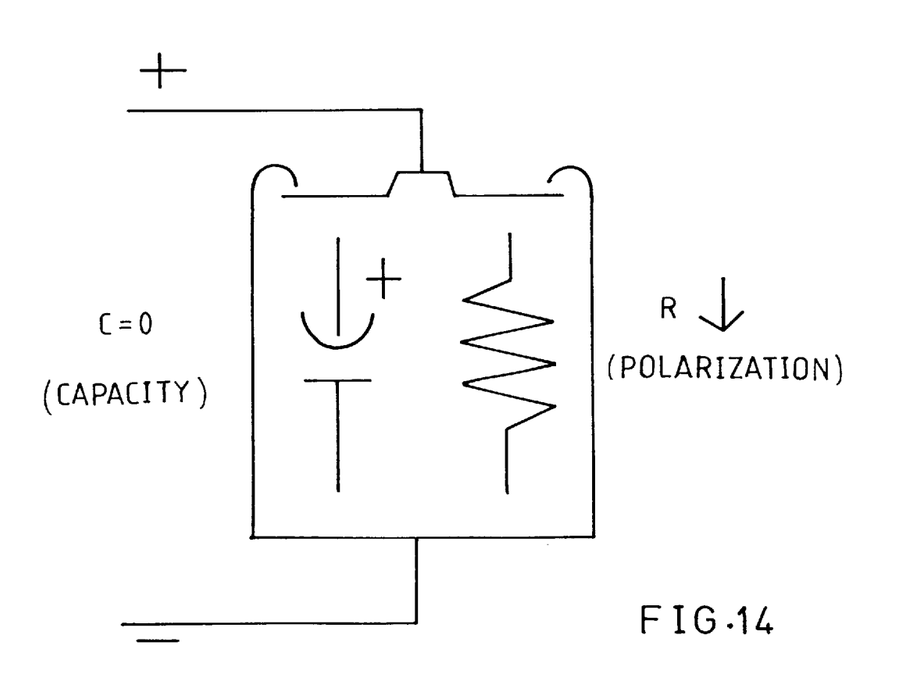
FIG. 14 shows the decreasing polarization of the internal active material and the decrease of effective resistance of a battery when it is over charged.

To explain the principle of this invention, one can model the reusable battery as a paralleled RC circuit structure shown in FIGS. 13 and 14. When the energy of the battery increases, the active substance gradually decreases and the ionic exchange slows down. The internal resistance R is also increased gradually. In other words, the effective internal resistance increases and the effective electric capacity decreases as the battery charging proceeds. Therefore, the constant voltage used in this invention will result in decreasing electric current. The phenomenon is illustrated in FIG. 13. When all the active substance turns into metal compound through the ionic exchange, all the energy supplied to the battery will be converted to heat. At this moment, the effective capacity is zero. The effective resistance decreases due to the polarization as shown in FIG. 14. The constant voltage used in this invention makes the electric current increase. This invention detects the effect of current increase at the end of charging period and terminates the charging process.

The key consideration in using constant voltage for charging battery is how to select an optimal voltage level. It is important to take into account the electric characteristics and the practical application in determining the right voltage. The commonly used electrolyte such as KOH is water soluble. The voltage for each individual battery should not exceed the electrolysis voltage of water which is close to 2.0 volts. Because the electric potential between the nickel metal and the negative electrode is approximately 1.2 volts, the charging voltage should not be less than 1.2 volts in order to have enough energy to cause ionic reaction. Based on the above analysis, the charge voltage should be set approximately between 1.3 volts and 1.9 volts. The other two factors in determining the voltage is the charging speed and safety. To achieve high charging rate, it is necessary that the voltage be higher than 1.5 volts. For safety, it is important to set the voltage below 1.7 volts because the electric characteristic of the battery is greatly affected by the temperature. High temperature results in decreasing resistance and low temperature results in increasing resistance. A voltage lower than 1.7 volts can maintain relative stable temperature. Therefore, a voltage between 1.5 volts and 1.7 volts is optimal for this invention. A voltage range of 0.2 volts allows the design of the charging system to suit different specification of different battery material. The difference in the charging rate resulted from the small voltage range will only slightly affect the charging speed, and the beginning and ending temperature.

Figure 15:
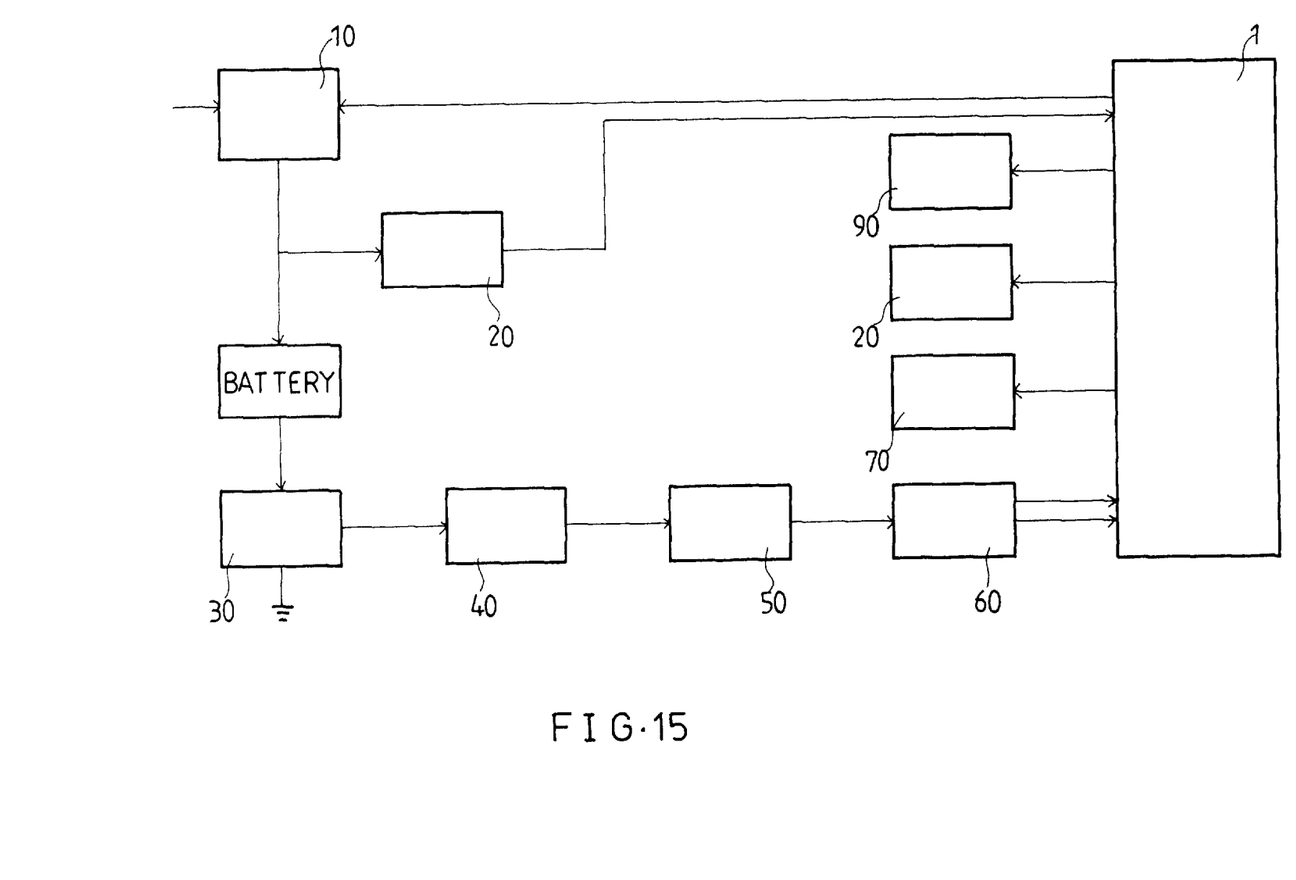
FIG. 15 is a block diagram of the circuit for the automatic charging system of this invention.

The preferred embodiments of this invention are shown in FIG. 15. A single chip microcomputer 1 is used to control the automatic charging system of the invention. The microcomputer contains a CPU, ROMS, RAMs, I/O ports, control timing circuits, and other circuits. It is a low-cost and versatile device. The system of the present invention comprises a constant voltage power supply 10 that has a short-circuit protection device, a battery voltage detector 20, a current detector 30, a current to voltage converter 40, a voltage amplifier 50, an analog to digital converter (A-D converter) 60, a single chip microcomputer 1, a capacity indicator 70, a time indicator 80 and a full-charge indicator 90. A DC voltage is used to supply power to the system. The constant voltage power supply regulates the supplied power and provides a stable DC voltage. The power supply can be either a linear power supply or a switching power supply. It is important to contain a short-circuit protection device in order to prevent the damage of the power supply or the external power source due to unexpected large current.

Figure 16:
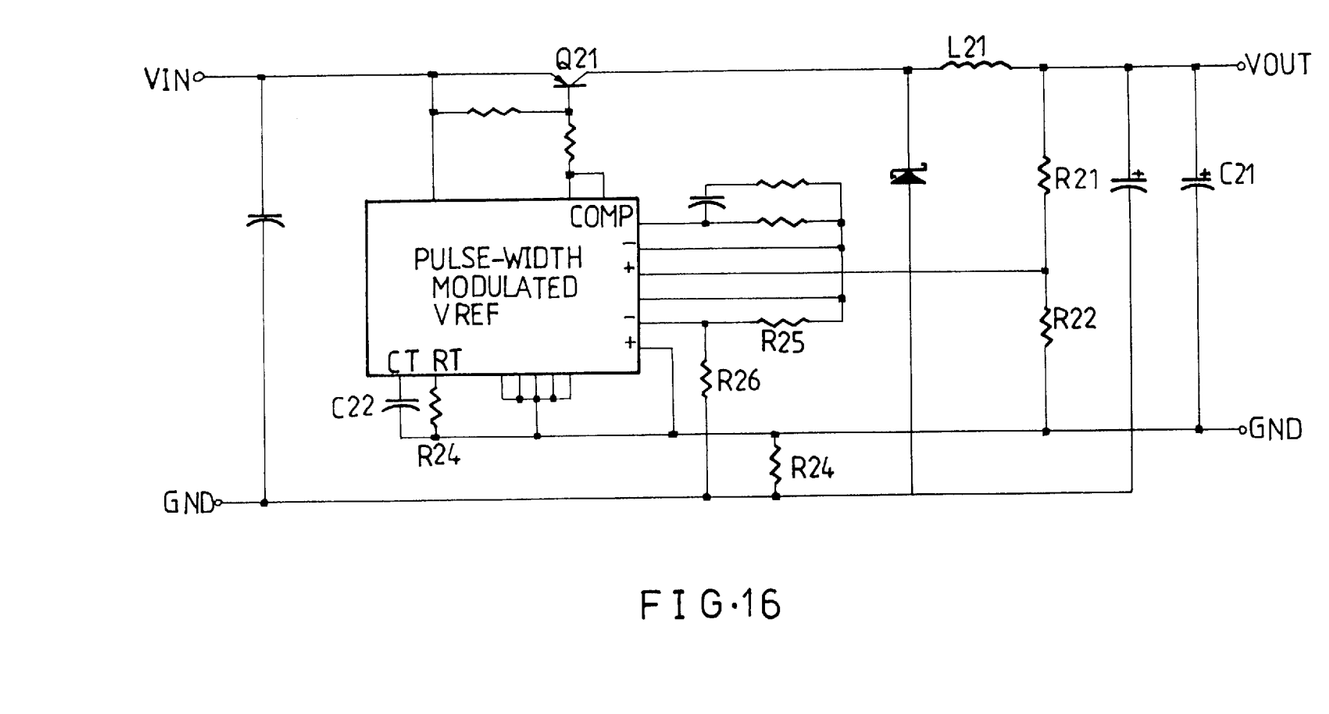
FIG. 16 is the circuit of the constant voltage power supply used in this invention.

As shown in FIG. 16, a switching power supply is preferred for the invention because of its small volume, light weight and high efficiency. The main circuit in the short-circuit protection device is a pulse width modulator (PWM). The combination of R21 and R22 provides a voltage level across R22 for the comparison with the reference voltage of the PWM to control the on or off of the power transistor Q21. L21 and C21 serve as a filtering circuit to maintain a stable DC power supply. C22 and R23 control the working frequency of the PWM. If C22 is short circuited, PWM will have no output. A 0.1Ω high precision resistor R24 is connected between the input ground and the output ground. When the voltage level introduced by the current flowing through R24 is close to the voltage across R26, the power supply will limit the output current to protect the power supply.

Figure 17:
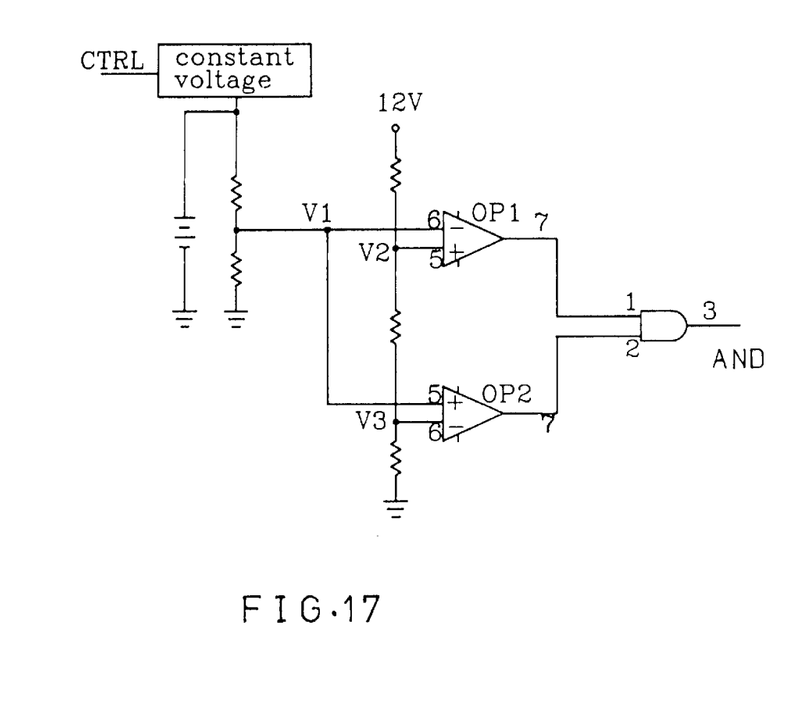
FIG. 17 is the circuit of the battery voltage detector.

The battery voltage detector 20 as shown in FIG. 17 determines if batteries are available for charging. The voltage detector has a preset voltage range between V2 and V3. When no battery is connected, V1 is the reference voltage provided by the power supply or zero voltage if turned off by the microcomputer. Under this circumstance, V1 is out of the range between V2 and V3. The output of the AND gate is "Lo" indicating that no battery is to be charged. When the battery is connected, V1 voltage cannot be higher than the reference voltage provided by the power supply. Hence, V1 voltage is within the range between V2 and V3 and the output of the AND gate is "Hi" indicating the existence of a connected battery. The output of the AND gate is sent to the microcomputer. As soon as the microcomputer detects the signal showing that a battery is connected in the system, it starts controlling the charging process by detecting the charging current.

Figure 18:
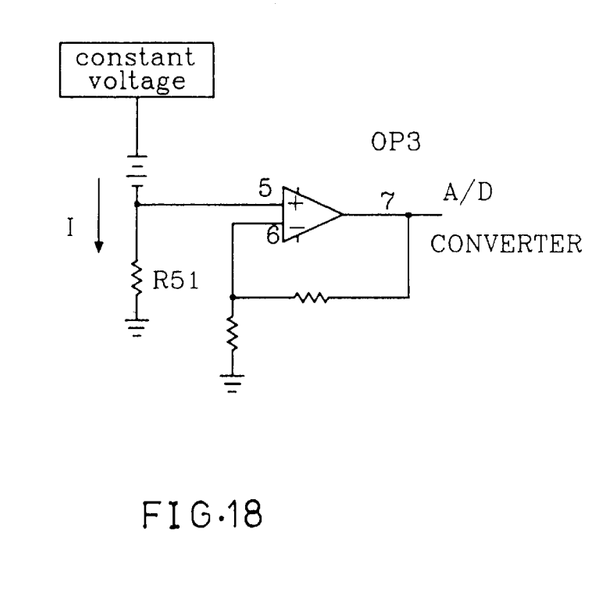
FIG. 18 is the circuit of the current to voltage converter.

The current detector 30 is shown in FIG. 18. As shown in the figure, there is a high precision resistor R51 in the battery charging loop to detect charge current. R51 has a very small resistance and, hence, the voltage across R51 is also very small. In order to provide a reasonable signal level to the input of the A-D converter 60, an in-phase voltage amplifier 50 OP3 is used to amplify the voltage across R51. The amplified voltage is digitalized and the digitalized signal is sent to the microcomputer for analysis.

Figure 19:
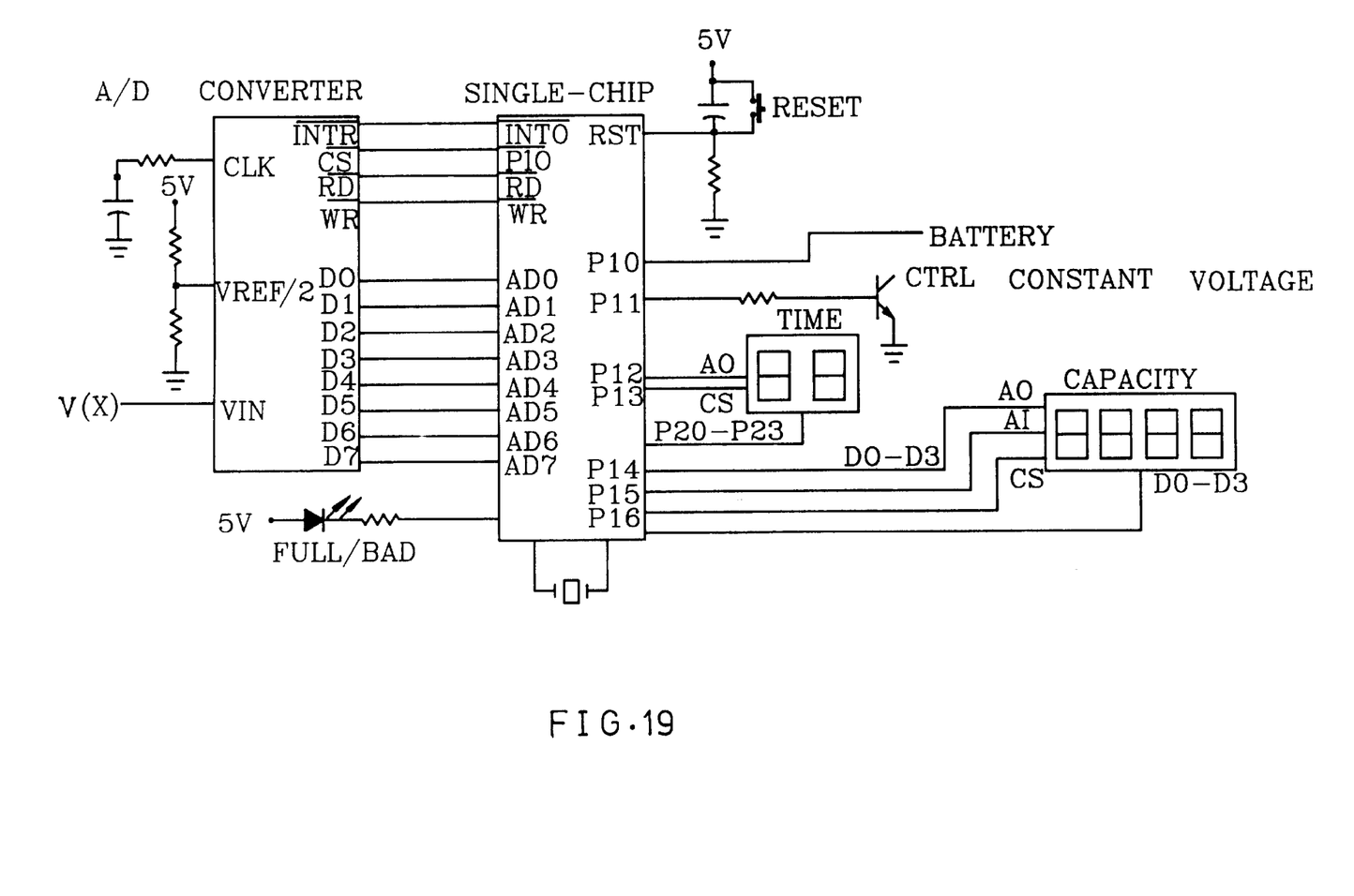
FIG. 19 shows the connections of the single chip microcomputer, the analog to digital converter, and other peripheral circuits.

The connection of the A-D converter 60 to the microcomputer, the time indicator 80, the capacity indicator 70, and other peripheral circuits is shown in FIG. 19. The time indicator uses one second as its unit. The display is a multiplex display. Pin P12 selects which digit to display P20–P23 provide the input data. The display for capacity indicator is also multiplex. Its unit is MAH. P14 and P15 select display digit and P24–P27 are input data. The use of multiplex display allows several data lines to be saved for other purposes. P17 is connected to an LED that is turned on when the charging is on going. When the battery has been fully charged or is not in the system, the LED is turned off. If LED flashes, it indicates that the battery is broken or damaged.

Figure 20:
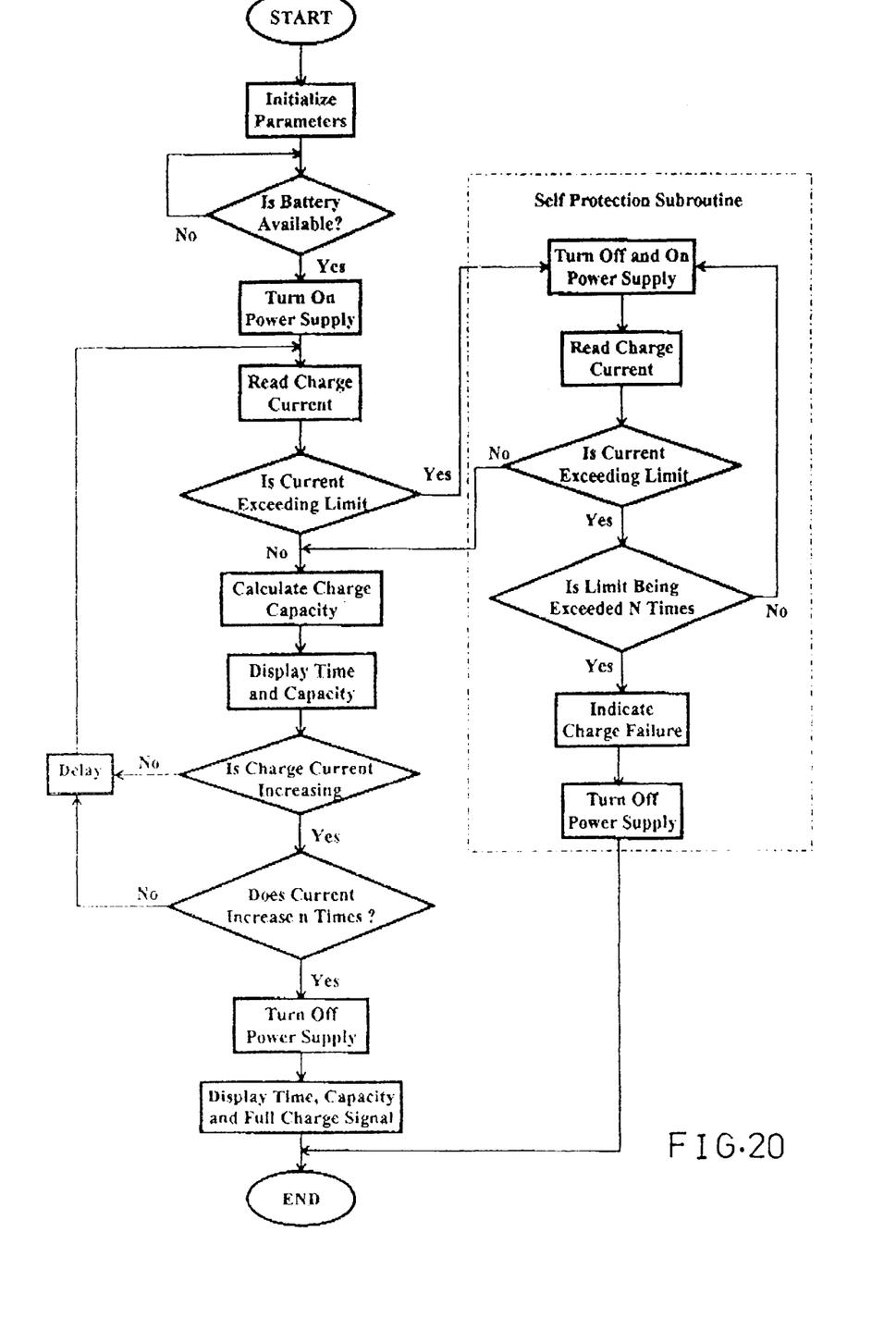
FIG. 20 shows the flow chart of the control program used in the microcomputer of this invention.

The microcomputer controls the initialization and operation of the automatic charging system in the invention. The flow chart of the microcomputer program that controls the charging process using lowest current detection method of this invention is shown in FIG. 20. When the charging system is powered on, the microcomputer automatically resets and initializes necessary operational parameters such as the charge current limit, the current-overloading count limit and the current-increasing count limit for the system. The main routine of the program then checks if there are batteries connected in the system. If no battery is in the system, the main routine repeats the battery checking loop until batteries are detected in the system. When batteries are detected, the constant voltage power supply is turned on to supply a constant voltage to charge the batteries. The signal level from the current detector is monitored to determine if the current exceeds the preset charge current limit during the charging process.

If the system detects that the charge current exceeds the limit, the program enters a self-protection subroutine that turns off the power supply to avoid overloading the system. The subroutine then turns on the power supply and monitors the current detection signal again. If the current no longer exceeds the limit, the subroutine returns back to the main routine. If the current still exceeds the limit, the subroutine repeats the off-and-on current checking procedure as just described. The number of iterations performed for the checking procedure is updated and compared to the preset current over-loading count limit N. If the number of iterations exceeds N times, the subroutine stops the charging process and flashes the LED to indicate failure. Before the iterations reach N times, the subroutine returns to the main routine if the current no longer exceeds the limit.

If the charge current does not exceed the limit, the main routine takes the charge current value and calculates the accumulated battery capacity. The charging time and the capacity are displayed on the respective indicators. The charging efficiency of this invention is approximately 80±2%. To compute the accumulated charging capacity, the detected current is integrated and summed. The result is then multiplied by 80% and displayed on the indicator. In the normal charging process, the system turns on the LED and continues to check the current level, compute and display the capacity every certain period of times. In the meanwhile, the current level is also examined to see how the current changes. If the current level decreases, the system continues its normal charging process. If the current level increases, the system counts the number of times for which the current level increases continuously. The pre-determined current increasing count limit n is used as a criteria. If the number of times is less than n, it is considered as noise. The system continues its normal charging process and restarts the counting of current increase times. On the contrary, if the number of times is more than n, it indicates that the charge current has passed the lowest current point and the charging process has reached the end. The system turns off the LED to indicate full-charge, shuts off the power supply to the charging circuit and ends the charging process. When the charged battery is removed, the system can be reset to the initial condition to check and wait for batteries to be charged.

As described above, this invention presents a new battery charging system. It uses the method of detecting the lowest charge current as presented above to stop the charging process. The system has very high efficiency because it takes into account the chemical reaction and the quantity of active ions when supplying charge current. The preferred embodiments have been shown and illustrated. It is requested that all changes and modifications that come within the spirit of the invention are to be protected.

What is claimed is:

1. An automatic battery charging system comprising:
    a power supply comprising a short-circuit protection device, a DC voltage output that provides a DC voltage at a constant level, and a control signal input;
    a battery container having a first end connected to said DC voltage output and a second end connected to a current detector that detects a charge current flowing through at least one battery contained in said battery container;
    a voltage detector coupled to said first end of said battery container to detect a voltage level in said battery, said voltage detector generating a voltage detector output signal when said voltage level in said battery is within a voltage range chosen by a user;
    a current to voltage converter coupled to said current detector to convert said charge current to a voltage signal, said voltage signal is amplified by a voltage amplifier connected to said current to voltage converter, said amplifier generates an amplified voltage signal;
    an analog to digital converter coupled to said voltage amplifier, said analog to digital converter converting said amplified voltage signal to a digital signal proportional to said charge current;
    a microcomputer control means comprising a first input connected to said digital signal, a second input connected to said voltage detector output signal, an output connected to said control signal input of said power supply, and a plurality of peripheral outputs to receive display devices, said display devices comprising a time indicator, a full-charge indicator, and a charge capacity indicator; wherein said microcomputer control means detects a lowest value of said charge current and deactivates said power supply when said lowest value of said charge current exceeds a cutoff level chosen by said user.

2. The automatic battery charging system of claim 1 wherein:

said constant level of said DC voltage output of said power supply is between 1.5 volts and 1.7 volts.

3. The automatic battery charging system of claim 1 wherein:

said microcomputer control means comprises
- a) means to initialize a plurality of parameters including a charge current limit, a current-overloading count limit, and a current-increasing count limit;
- b) means to detect a presence of batteries in said battery container by monitoring said output signal of said voltage detector;
- c) means to activate said power supply;
- d) means to read said digital signal to determine a value of said charge current, and to compute a value of said charge capacity from said value of said charge current;
- e) means to transmit a time that said power supply has been activated to said time indicator;
- f) means to transmit said computed value of said charge capacity to said charge capacity indicator;
- g) means to monitor said charge current;
- h) means to protect said device from current-overloading when said charge current exceeds said cutoff level chosen by said user, said current overloading protection means comprising;
    - h1) means to initialize a current-overloading count,
    - h2) means to turn off and on said power supply,
    - h3) means to determine whether said charge current value exceeds said cutoff level chosen by said user,
    - h4) means to increment said current-overloading count,
    - h5) means to compare said current-overloading count to said current-overloading count limit,
    - h6) means to cause said full-charge indicator to flash when said current-overloading count exceeds said current-overloading count limit;
- i. means to determine whether said charge current value has increased between successive measurements;

such that said microcomputer control means repeatedly monitors said charge current value and turns off said power supply when said charge current value has reached said cutoff level chosen by said user.

* * * * *